United States Patent
Thomas et al.

(10) Patent No.: US 10,539,153 B2
(45) Date of Patent: Jan. 21, 2020

(54) CLIPPED HEAT SHIELD ASSEMBLY

(71) Applicant: General Electric Company, Schenectady, NY (US)

(72) Inventors: Michael Anthony Thomas, Union, KY (US); Abhishek Jayant Patil, Karnataka (IN); Manish Singhal, Karnataka (IN)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 15/458,105

(22) Filed: Mar. 14, 2017

(65) Prior Publication Data

US 2018/0266439 A1  Sep. 20, 2018

(51) Int. Cl.
  *F04D 29/52* (2006.01)
  *F04D 29/54* (2006.01)
  *F04D 19/02* (2006.01)
  *F02C 9/18* (2006.01)

(52) U.S. Cl.
  CPC .............. *F04D 29/522* (2013.01); *F02C 9/18* (2013.01); *F04D 19/02* (2013.01); *F04D 29/545* (2013.01)

(58) Field of Classification Search
  CPC ...... F04D 29/542; F04D 27/023; F01D 9/041; F01D 9/04; F01D 25/243; F01D 11/18; F01D 25/26; F01D 25/14; F02C 9/18
  USPC ......................................................... 415/144
  See application file for complete search history.

(56) References Cited

U.S. PATENT DOCUMENTS

| | | | |
|---|---|---|---|
| 3,945,759 A | | 3/1976 | Bobo |
| 4,190,397 A | | 2/1980 | Schilling et al. |
| 5,155,993 A | * | 10/1992 | Baughman ............ F04D 27/023 60/226.1 |
| 5,680,754 A | | 10/1997 | Giffin et al. |
| 6,325,595 B1 | | 12/2001 | Breeze-Stringfellow et al. |

(Continued)

FOREIGN PATENT DOCUMENTS

FR  2925108 A1 *  6/2009  .............. F01D 11/18

OTHER PUBLICATIONS

English Translation of FR 2925108A1 (Year: 2009).*

*Primary Examiner* — Dwayne J White
*Assistant Examiner* — Wesley Le Fisher
(74) *Attorney, Agent, or Firm* — Dority & Manning, P.A.

(57) ABSTRACT

Bleed air system includes bleed port with annular bleed slot in a compressor inner casing surrounding flowpath circumscribing a centerline in compressor inner casing. Inner and outer slot walls bound bleed flow passage through the bleed slot. Annular array of arcuate shields radially inwardly bound the bleed flow passage downstream and aft of inner slot wall. Each shield includes integrally-formed axially forward retaining portion, downstream portion, and upstream portion therebetween. Clipping means clips retaining portion to aft facing radial wall of annular lip on inner slot wall. Clipping means may be arcuate or annular clip having forward annular portion attached to annular aft flange substantially perpendicular to the centerline and forward annular portion disposed in annular slot extending into inner slot wall. Forward annular portion and annular slot may be cylindrical or conical. Clip may include aft conical portion radially offset from forward conical portion and transition portion therebetween.

25 Claims, 5 Drawing Sheets

(56) References Cited

U.S. PATENT DOCUMENTS

| | | | |
|---|---|---|---|
| 6,390,771 B1 * | 5/2002 | Gervais | F01D 11/18 |
| | | | 415/139 |
| 6,783,324 B2 | 8/2004 | Muny | |
| 7,094,020 B2 | 8/2006 | Dong et al. | |
| 7,249,463 B2 | 7/2007 | Anderson et al. | |
| 7,264,441 B2 | 9/2007 | Loudet | |
| 7,704,038 B2 | 4/2010 | Ring et al. | |
| 8,388,308 B2 | 3/2013 | Karafillis et al. | |
| 8,556,561 B2 | 10/2013 | Norton | |
| 8,734,091 B2 | 5/2014 | Moniz et al. | |
| 2008/0120841 A1 * | 5/2008 | Ring | F01D 25/14 |
| | | | 29/888.025 |
| 2009/0297335 A1 * | 12/2009 | Karafillis | F01D 17/105 |
| | | | 415/115 |
| 2014/0023487 A1 | 1/2014 | Dougan et al. | |

* cited by examiner

CLIPPED HEAT SHIELD ASSEMBLY

BACKGROUND OF THE INVENTION

Technical Field

The present invention relates generally to gas turbine engine compressor heat shields near bleed ports.

Background Information

Gas turbine engines, such as an aircraft bypass turbofan engine, may bleed or extract air between stages of a multi-stage axial compressor for various purposes such as turbine cooling, hot cavity purging, anti-ice, compressor clearance control, or turbine clearance control and is often referred to as domestic bleed because it is used for the engine. This bleed or secondary air is also often used to pressurize the aircraft cabin and for other aircraft purposes and is, thus, referred to as customer bleed. U.S. Pat. No. 8,388,308, entitled "Asymmetric Flow Extraction System" discloses a system for asymmetric flow extraction including a flow path, a bleed slot in the flow path, a bleed cavity for receiving at least a portion of the fluid extracted from the flow path and a bleed passage in flow communication with the bleed slot and the bleed cavity. In the exemplary embodiment disclosed therein, the compressor has a stator body that includes a shield assembly to shield local static structures and increase static pressure recovery. A bleed passage between a bleed slot and a bleed cavity is, in part, defined and bounded by a heat shield of the shield assembly. U.S. Pat. No. 8,388,308 is assigned to the General Electric Company, the assignee of the present patent, and is hereby incorporated by reference.

Such heat shields serve dual purposes of protection and sealing to provide a good aerodynamic surface for the bleed passage. The heat shield must continuously seal against an axial face to prevent leakage of bleed air.

Distortion caused by this assembly interference can impact bleed pressure recovery. Current heat shield designs rely on surface friction to maintain the position of the heat shield or use a bend in the heat shield to provide a radial stop. It is desirable to provide a heat shield assembly that constrains heat shield deflections in the bleed slot, radially positioning the heat shield relative to a compressor casing with greater accuracy, thus, maximizing pressure recovery of the bleed air.

BRIEF DESCRIPTION OF THE INVENTION

A gas turbine engine bleed air system includes a bleed port in a compressor inner casing surrounding a compressor flowpath of a high pressure compressor circumscribing a centerline. The bleed port includes an annular bleed slot or opening in the compressor inner casing. Inner and outer slot walls radially inwardly and outwardly respectively bound a bleed flow passage through the bleed slot and an annular lip is on the inner slot wall.

An annular array of arcuate shields radially inwardly bound the bleed flow passage downstream and aft of the inner slot wall. Each of the shields includes an integrally-formed axially forward retaining portion, a downstream portion, and an upstream portion therebetween. The retaining portion being a free end having a radially inner annular edge. The system further includes a clipping means for clipping the retaining portion to an aft facing radial wall of the annular lip.

The clipping means may include an arcuate or annular clip having a forward annular portion attached to an annular aft flange, the aft flange substantially perpendicular to the centerline, and the forward annular portion disposed in an annular slot extending into the inner slot wall. The retaining portion may be substantially perpendicular to the centerline. The forward annular portion and the annular slot may be cylindrical or conical.

Alternatively, the arcuate or annular clip may include an aft conical portion aft of and radially offset from a forward conical portion, a transition portion therebetween connecting the aft conical portion to the forward conical portion, and the forward conical portion disposed in an annular slot extending into the inner slot wall. The forward retaining portion of the arcuate shield may be bonded or brazed to the aft conical portion of the annular clip. The forward retaining portion and the forward and aft conical portions may be congruent having the same conical angle.

Alternatively, the arcuate or annular clip may include an annular block radially inwardly resting on a step or ledge machined into the inner slot wall. The annular block clipping the retaining portion to the aft facing radial wall of the annular lip and the forward retaining portion radially inwardly restrained by the step or ledge. The annular block may be bonded or brazed to the forward retaining portion of the arcuate shield.

The downstream portion of the arcuate shield my be fastened to a casing flange extending radially outwardly from the compressor inner casing. The downstream portion may include an aft annular flange and a fastener slot extending therethrough. A fastener may be disposed in forward or upstream serial progression through the fastener slot, the casing flange, and a lip flange attached to the lip at an aft end of the lip. The fastener may be threaded into an internally and externally threaded insert threaded in an internally threaded hole in the lip flange.

DETAILED DESCRIPTION OF THE INVENTION

Figure 1:
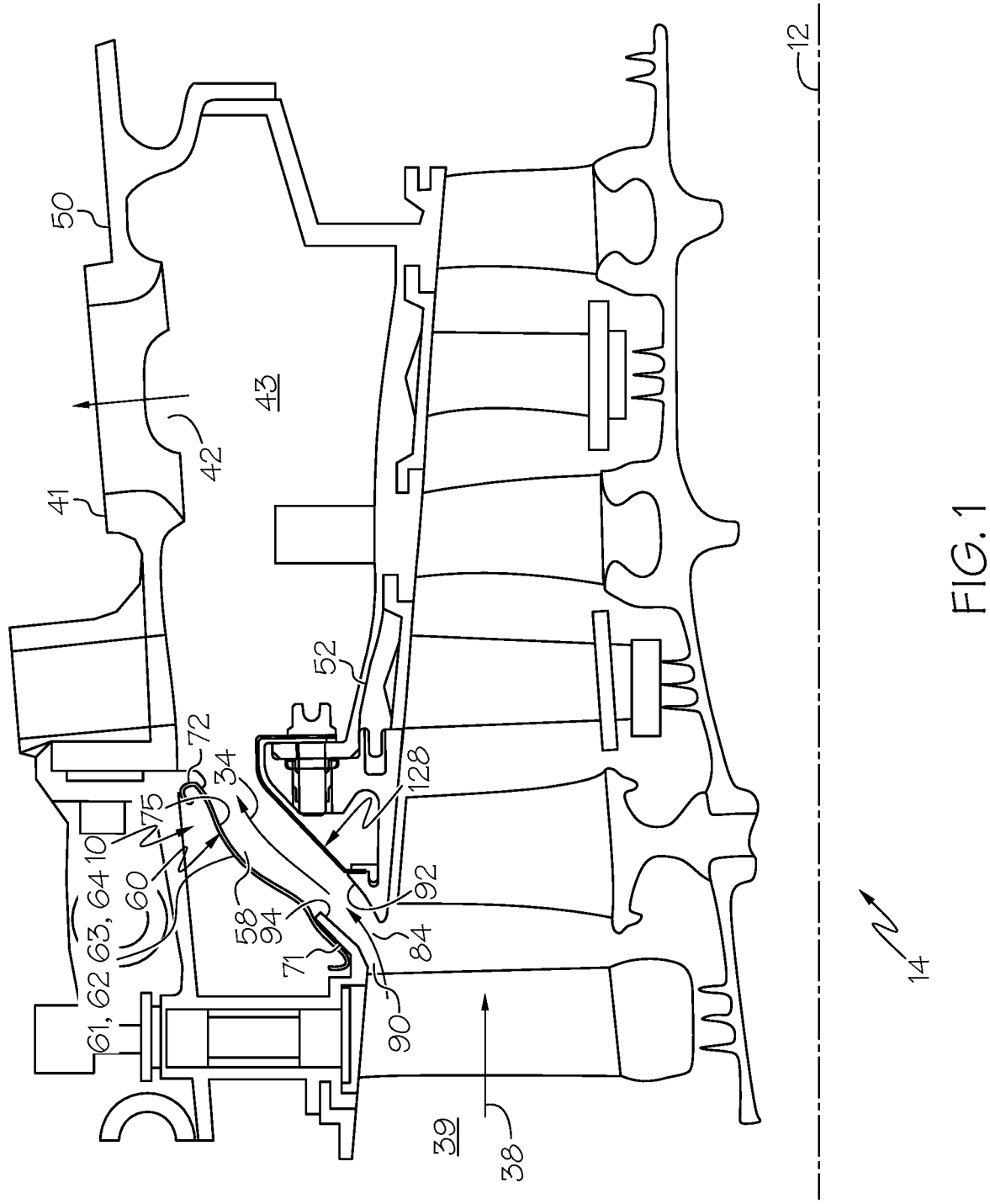
FIG. 1 is an axial cross-sectional view illustration of a gas turbine engine high pressure compressor section with a bleed path partially bounded by a clipped heat shield assembly.

Illustrated in FIG. 1 is a portion of a gas turbine engine high pressure compressor 14 circumscribed about a gas turbine engine centerline 12. FIG. 1 further illustrates an exemplary embodiment of a bleed air system 10 including a bleed port 84 in a compressor flowpath 39 of the high pressure compressor 14. The bleed port 84 is illustrated as an annular bleed slot 90 or opening in a compressor inner casing 52 and includes, in part, a bleed flow passage 58 therein. The bleed slot 90 is used for extracting compressor bleed flow 34 from compressor flow 38 in the compressor flowpath 39 and flowing it into an annular bleed plenum 43 circumferentially disposed between radially spaced apart annular outer casing 50 and the inner casing 52. A bleed outlet 42 radially disposed through the outer casing 50 is in fluid flow communication with and serves as an outlet from the annular bleed plenum 43. The bleed outlet 42 is an inlet to a bleed duct 41 providing compressor bleed air for use as customer and domestic or engine bleed air.

Figure 2:
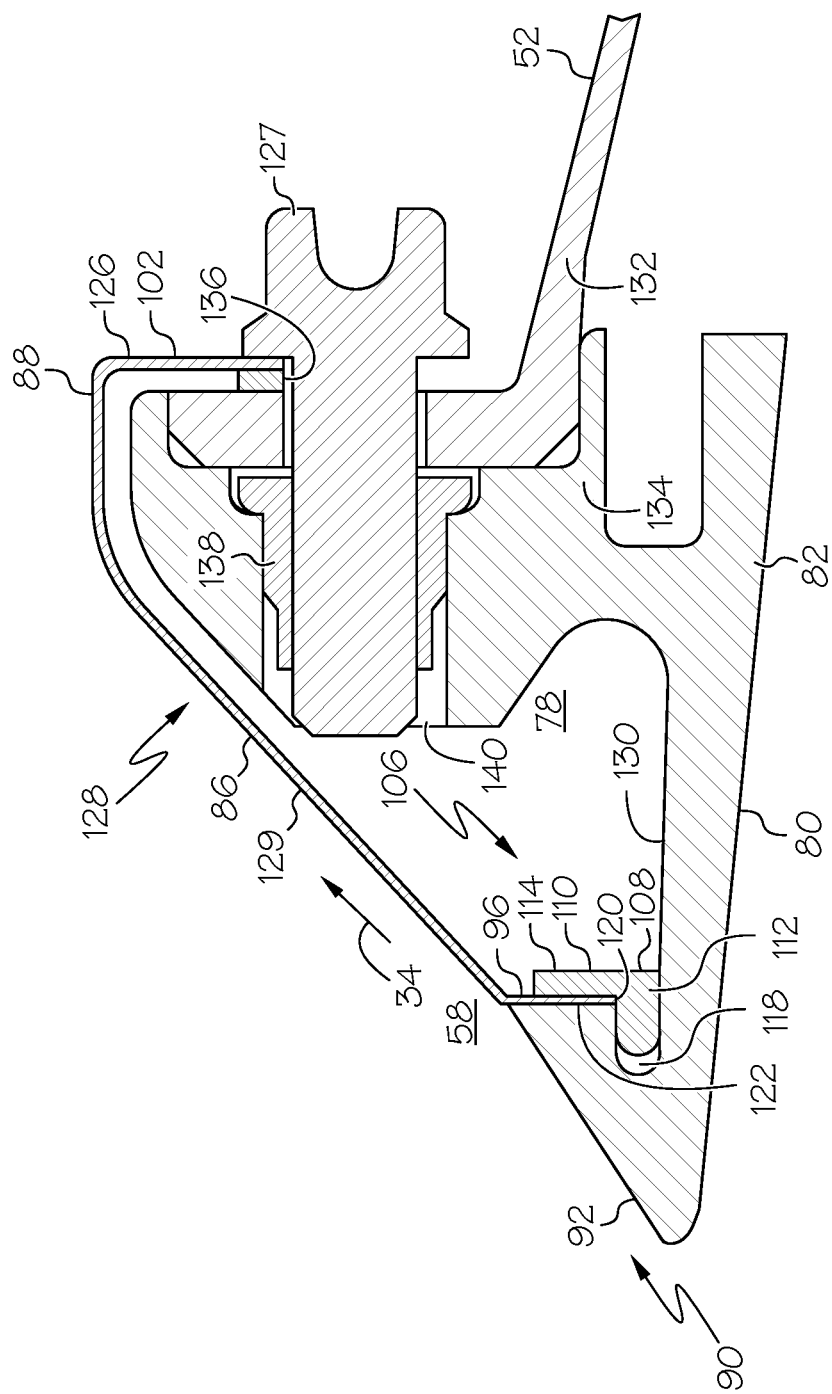
FIG. 2 is an enlarged axial cross-sectional view illustration of a first exemplary embodiment of a clipped heat shield of the clipped heat shield assembly illustrated in FIG. 1.

Referring to FIGS. 1 and 2, the bleed slot 90 extends radially through the inner casing 52 and aft or downstream from the compressor flowpath 39 into the annular bleed plenum 43. The bleed flow passage 58 through the bleed slot 90 is radially inwardly and outwardly bounded by inner and outer slot walls 92, 94 respectively. An annular lip 80 on the inner slot wall 92 helps extract the compressor bleed flow 34 from the compressor flow 38 in the compressor flowpath 39. The annular lip 80 includes a lead edge radius R of the bleed slot 90, illustrated in FIG. 3, and may be referred to as a "bullnose". The exemplary embodiment of the bleed flow passage 58 is in part defined by a deflector assembly 60 including a plurality of deflectors 61, 62, 63, 64 arranged circumferentially. The exemplary deflector 61 illustrated herein, in part, forms the bleed flow passage 58 and includes a forward end 71, an aft end 72, and an aerodynamic surface 75 therebetween. The bleed flow passage 58 downstream or aft of the bleed slot 90 and is disposed between the annular aerodynamic surface 75 and an annular shield assembly 128 spaced apart from it.

Further referring to FIGS. 1 and 2, the annular shield assembly 128 is used to increase static pressure recovery in the compressor bleed flow 34 through the bleed flow passage 58 between the annular aerodynamic surface 75 and an annular shield surface 129 of the annular shield assembly 128. The exemplary embodiment of the annular shield assembly 128 illustrated herein includes an annular array of arcuate shields 126 radially inwardly bounding the bleed flow passage 58 and being disposed around the inner casing 52 downstream and aft of the inner slot wall 92. Each of the shields 126 includes an integrally-formed one piece axially forward retaining portion 122, an upstream portion 86 having an aerodynamically contoured annular shield upstream surface 124, and a downstream portion 88. The upstream portion 86 extends between the retaining portion 122 and the downstream portion 88 of the annular shield 126. The downstream portion 88 includes a downstream retaining portion 102 with a fastener slot 136 extending therethrough. The fastener slot 136 is sized to receive a fastener 127 therethrough that fastens the downstream portion 88 to a radially outwardly extending casing flange 132 extending radially outwardly from the compressor inner casing 52. The forward retaining portion 122 and the downstream retaining portion 102 are substantially perpendicular with respect to the centerline 12. The forward retaining portion 122 is a free end having a radially inner annular edge 120.

The annular shield assembly 128 is mounted or coupled or clipped to the inner slot wall 92 of the inner casing 52. A retaining channel 78 is formed in and circumferentially around the inner slot wall 92 between an aft facing radial wall 96 of the annular lip 80 and a lip flange 134 attached to the lip 80 at an aft end 82 of the lip 80. A clipping means 106 clips the retaining portion 122 including the radially inner annular edge 120 to the aft facing radial wall 96 of the annular lip 80 and provides radial restraint of the shield 126. The clipping means 106 radially constrains the arcuate shield 126 for preventing arcuate heat shield deflections in the bleed slot, radially positions the arcuate heat shield relative to the casing with greater accuracy, and helps maximize pressure recovery in the bleed slot. The radially inner annular edge 120 on the free end or the retaining portion 122 remains positioned above a bottom 130 of the retaining channel 78.

The fastener 127 is disposed, in forward or upstream serial progression through the fastener slot 136, the radially outwardly extending casing flange 132, and threaded into an internally and externally threaded insert 138 which is threaded in an internally threaded hole 140 in the lip flange 134. This secures the annular shield 126 by way of the downstream retaining portion 102 to the lip flange 134 and the casing flange 132 extending radially outwardly from the compressor inner casing 52. The downstream portion 88 includes the downstream retaining portion 102 with a fastener slot 136 extending therethrough.

The annular shield assembly 128 is mounted or coupled or clipped to the inner slot wall 92 of the inner casing 52. A retaining channel 78 is formed in and circumferentially around the inner slot wall 92 between an aft facing radial wall 96 of the annular lip 80 and a lip flange 134 attached to the lip 80 at an aft end 82 of the lip 80.

FIG. 2 illustrates an embodiment of the clipping means 106 in the form of an arcuate or annular clip 108 that includes a two part annular member 110 having a forward arcuate or annular portion 112 attached to an annular aft flange 114 that is substantially perpendicular with respect to the centerline 12. The forward arcuate or annular portion 112 is disposed in an annular slot 118 extending into the inner slot wall 92 of the inner casing 52. The particular embodiment of the forward arcuate or annular portion 112 and the annular slot 118 illustrated in FIG. 2 are cylindrical. The forward retaining portion 122 of the arcuate shield 126 is clipped between the annular aft flange 114 and the inner slot wall 92 of the inner casing 52. The forward retaining portion 122 is radially restrained by the forward annular portion 112. The annular slot 118 is illustrated as being radially located at the bottom 130 of the retaining channel 78 but, alternatively, may be radially located above the bottom 130 of the retaining channel 78.

Figure 3:
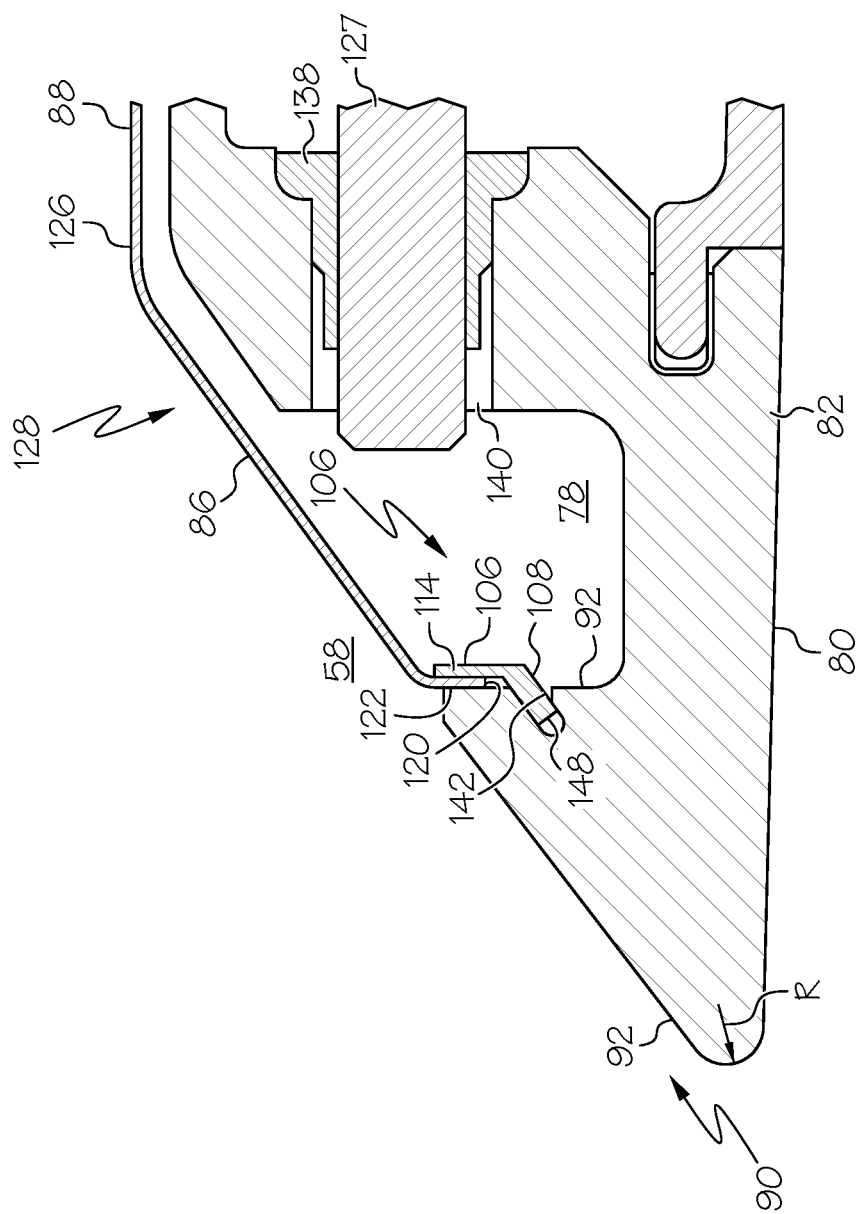
FIG. 3 is an enlarged axial cross-sectional view illustration of a second exemplary embodiment of the clipped heat shield illustrated in FIG. 1.

FIG. 3 illustrates an embodiment of the clipping means 106 in the form of an annular clip 108 that includes a two part annular member 110 having a forward conical portion 142 attached to an annular aft flange 114 that is substantially perpendicular with respect to the centerline 12. The conical portion 142 is disposed in an annular conical slot 148 extending into the inner slot wall 92 of the inner casing 52. The forward retaining portion 122 of the arcuate shield 126 clipped between the annular aft flange 114 and the inner slot wall 92 of the inner casing 52. The forward retaining portion 122 is radially restrained by conical portion 142.

Figure 4:
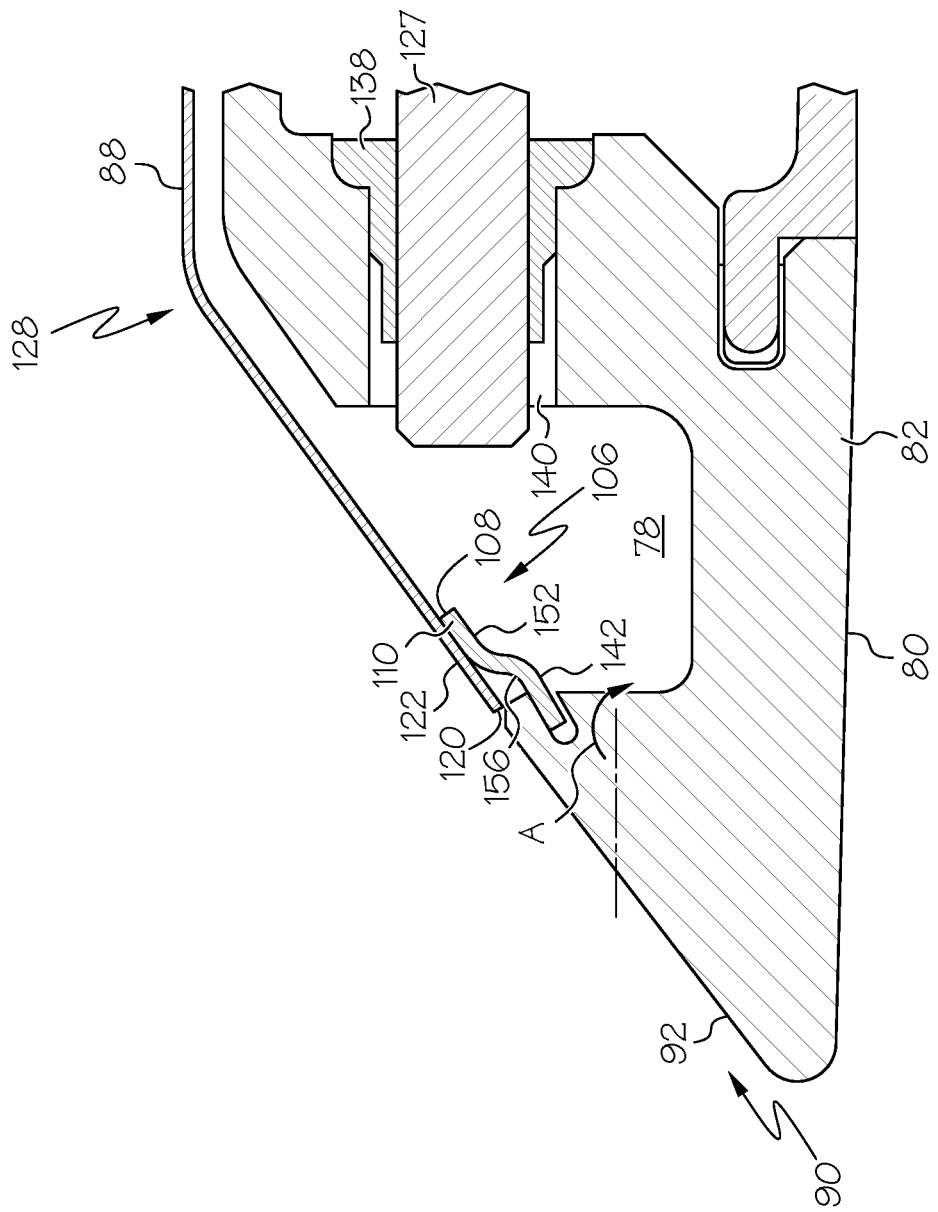
FIG. 4 is an enlarged diagrammatical cross-sectional view illustration of a third exemplary embodiment of the clipped heat shield illustrated in FIG. 1.

FIG. 4 illustrates an embodiment of the clipping means 106 in the form of an annular clip 108 that includes a three part annular member 110 having an aft conical portion 152 aft of and radially offset from a forward conical portion 142. A transition portion 156 connects the aft conical portion 152 to the forward conical portion 142. The exemplary embodiment of the transition portion 156 illustrated herein is S-shaped. The exemplary embodiment of the annular clip 108 illustrated herein includes congruent forward and aft conical portions 142, 152, and the forward retaining portion 122 of the arcuate shield 126, all three having the same conical angle A. The forward conical portion 142 is disposed in an annular conical slot 148 extending into the inner slot wall 92 of the inner casing 52. The forward retaining portion 122 of the arcuate shield 126 is conical as is the upstream portion 86. The forward retaining portion 122 and the upstream portion 86 may be congruent and have the same conical angle A. The forward retaining portion 122 may be an upstream or forward extension of the upstream portion 86. The forward retaining portion 122 of the arcuate shield 126 may be brazed or otherwise bonded to the aft conical portion 152 of the annular clip 108. The forward retaining portion 122 is radially restrained by the aft conical portion 152 of the annular clip 108.

Figure 5:
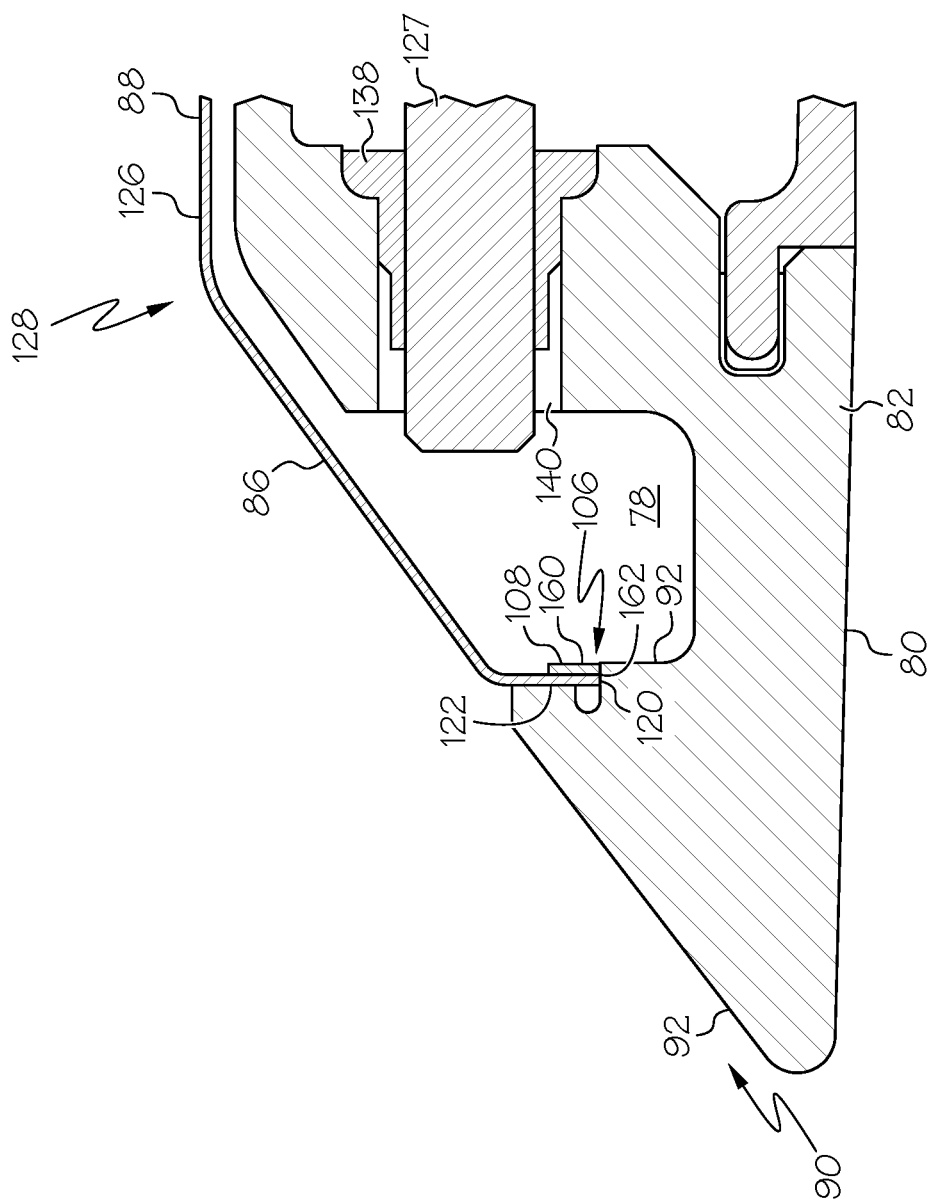
FIG. 5 is an enlarged diagrammatical cross-sectional view illustration of a fourth exemplary embodiment of the clipped heat shield illustrated in FIG. 1.

FIG. 5 illustrates an embodiment of the clipping means 106 in the form of an annular clip 108 that includes an annular block 160 radially inwardly resting on a step or ledge 162 machined into the inner slot wall 92 of the inner casing 52. The forward retaining portion 122 of the arcuate shield 126 is clipped between the annular block 160 and the inner slot wall 92 of the inner casing 52 radially outwardly of the ledge 162. The forward retaining portion 122 is radially inwardly restrained by the ledge 162. The block 160 may be brazed or otherwise bonded to the forward retaining portion 122 of the arcuate shield 126.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine bleed air system comprising:
   a bleed port in a compressor inner casing surrounding a compressor flowpath of a high pressure compressor circumscribing a centerline;
   the bleed port including an annular bleed slot in the compressor inner casing;
   inner and outer slot walls radially inwardly and outwardly respectively bounding a bleed flow passage through the bleed slot;
   an annular lip on the inner slot wall;
   an annular array of arcuate shields radially inwardly bounding the bleed flow passage downstream and aft of the inner slot wall;
   each of the shields including an integrally-formed axially forward retaining portion, a downstream portion, and an upstream portion therebetween;
   the retaining portion being a free end having a radially inner annular edge; and
   a clip portion that secures the forward retaining portion to an aft facing radial wall of the annular lip, wherein the clip portion is separate and apart from the arcuate shields.

2. The system as claimed in claim 1, further comprising:
   the clip portion including an annular clip having a forward annular portion attached to an annular aft flange,
   the aft flange substantially perpendicular to the centerline, and
   the forward annular portion disposed in an annular slot extending into the inner slot wall.

3. The system as claimed in claim 2, further comprising the retaining portion being substantially perpendicular to the centerline.

4. The system as claimed in claim 3, further comprising the forward annular portion and the annular slot being cylindrical.

5. The system as claimed in claim 3, further comprising the forward annular portion and the annular slot being conical.

6. The system as claimed in claim 1, further comprising:
   the clip portion including an annular clip including an aft conical portion aft of and radially offset from a forward conical portion,
   a transition portion therebetween connecting the aft conical portion to the forward conical portion, and
   the forward conical portion disposed in an annular slot extending into the inner slot wall.

7. The system as claimed in claim 6, further comprising the forward retaining portion of the arcuate shield bonded to the aft conical portion of the annular clip.

8. The system as claimed in claim 7, further comprising the forward retaining portion and the forward and aft conical portions being congruent having the same conical angle.

9. The system as claimed in claim 6, further comprising the forward retaining portion and the forward and aft conical portions being congruent having the same conical angle.

10. The system as claimed in claim 1, further comprising:
    the clip portion including an annular clip including an annular block radially inwardly resting on a step machined into the inner slot wall,
    the annular block clipping the retaining portion to the aft facing radial wall of the annular lip, and
    the forward retaining portion radially inwardly restrained by the step.

11. The system as claimed in claim 10, further comprising the annular block bonded to the forward retaining portion of the arcuate shield.

12. The system as claimed in claim 11, further comprising the retaining portion being substantially perpendicular to the centerline.

13. The system as claimed in claim 10, further comprising the retaining portion being substantially perpendicular to the centerline.

14. The system as claimed in claim 1, further comprising:
    a casing flange extending radially outwardly from the compressor inner casing,
    the downstream portion including a downstream retaining portion and a fastener slot extending therethrough,
    a lip flange attached to the lip at an aft end of the lip,
    a fastener disposed in forward serial progression through the fastener slot, the casing flange, and
    the fastener threaded into an internally and externally threaded insert threaded in an internally threaded hole in the lip flange.

15. The system as claimed in claim 14, further comprising:
    the clip portion including an annular clip having a forward annular portion attached to an annular aft flange,
    the aft flange substantially perpendicular to the centerline, and
    the forward annular portion disposed in an annular slot extending into the inner slot wall.

16. The system as claimed in claim 15, further comprising the retaining portion being substantially perpendicular to the centerline.

17. The system as claimed in claim 16, further comprising the forward annular portion and the annular slot being cylindrical or the forward annular portion and the annular slot being conical.

18. The system as claimed in claim 14, further comprising:

the clip portion including an annular clip including an aft conical portion aft of and radially offset from a forward conical portion,
a transition portion therebetween connecting the aft conical portion to the forward conical portion, and
the forward conical portion disposed in an annular slot extending into the inner slot wall.

19. The system as claimed in claim 18, further comprising the forward retaining portion of the arcuate shield bonded to the aft conical portion of the annular clip.

20. The system as claimed in claim 18, further comprising the forward retaining portion and the forward and aft conical portions being congruent having the same conical angle.

21. The system as claimed in claim 14, further comprising:
the clip portion including an annular clip including an annular block radially inwardly resting on a step machined into the inner slot wall,
the annular block clipping the retaining portion to the aft facing radial wall of the annular lip, and
the forward retaining portion radially inwardly restrained by the step.

22. The system as claimed in claim 21, further comprising the annular block bonded to the forward retaining portion of the arcuate shield.

23. The system as claimed in claim 22, further comprising the retaining portion being substantially perpendicular to the centerline.

24. The system as claimed in claim 20, further comprising the retaining portion being substantially perpendicular to the centerline.

25. A gas turbine engine bleed air system comprising:
a bleed port in a compressor inner casing surrounding a compressor flowpath of a high pressure compressor circumscribing a centerline;
the bleed port including an annular bleed slot in the compressor inner casing;
inner and outer slot walls radially inwardly and outwardly respectively bounding a bleed flow passage through the bleed slot;
an annular lip on the inner slot wall;
an annular array of arcuate shields radially inwardly bounding the bleed flow passage downstream and aft of the inner slot wall;
each of the shields including an integrally-formed axially forward retaining portion, a downstream portion, and an upstream portion therebetween;
the retaining portion being a free end having a radially inner annular edge; and
a clipping means for clipping the forward retaining portion to an aft facing radial wall of the annular lip, wherein the clipping means includes an annular clip having an aft conical portion aft of and radially offset from a forward conical portion, a transition portion therebetween connecting the aft conical portion to the forward conical portion, and the forward conical portion disposed in an annular slot extending into the inner slot wall.

* * * * *